United States Statutory Invention Registration [19]

[11] Reg. Number: H579

Fidelle et al.

[43] Published: Feb. 7, 1989

[54] HIGHLY FLAME RETARDED FLEXIBLE POLYVINYL CHLORIDE COMPOSITIONS AND METHODS FOR PRODUCING SAME

[75] Inventors: Thomas P. Fidelle; Robert J. Nulph, both of Lafayette, Ind.

[73] Assignee: Great Lakes Chemical Corporation, West Lafayette, Ind.

[21] Appl. No.: 113,570

[22] Filed: Oct. 26, 1987

[51] Int. Cl.[4] ..... C08K 5/09
[52] U.S. Cl. ..... 524/288
[58] Field of Search ..... 524/288, 410, 411, 412

[56] References Cited

U.S. PATENT DOCUMENTS 4,397,977 8/1983 Sandler ..... 524/288

OTHER PUBLICATIONS

Encyclopedia of Polymer Science and Technology vol. 10, 245–273, John Wiley & Sons, Inc., New York, 1969.
Encyclopedia of Polymer Science and Technology vol. 14, 394–400, John Wiley & Sons, Inc., New York, 1971.
Encyclopedia of Chemical Technology, vol. 18, 129–152, John Wiley & Sons, Inc., New York 1982.
Encyclopedia of PVC, vol. 1, Chapters 10 and 11, 386–574, Marcel Dekker, New York, 1976.

*Primary Examiner*—John F. Terapane
*Assistant Examiner*—Eric Jorgensen
*Attorney, Agent, or Firm*—Kirkland & Ellis

[57] ABSTRACT

Flexible polyvinyl chloride resin compositions combining a high degree of flame retardancy and thermal stability comprise di-2-ethylhexyl tetrabromophthalate and an optional flame retardant enhancing agent.

7 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGHLY FLAME RETARDED FLEXIBLE POLYVINYL CHLORIDE COMPOSITIONS AND METHODS FOR PRODUCING SAME

BACKGROUND OF THE INVENTION

1. Field of the Invention

This invention relates to plasticized polyvinyl chloride resins having improved flame retardancy and, in particular, it relates to methods for producing highly flame retarded plasticized polyvinyl chloride resins containing the di-2-ethylhexyl ester of tetrabromophthalic acid and, optionally, a flame retardant enhancer such as antimony oxide.

2. Description of the Prior Art

Plasticized polyvinyl chloride (PVC) resins are a well known class of thermoplastic resins which combine excellent chemical and corrosion resistance, good physical strength, and excellent electrical insulation properties. These properties may be extensively modified through the choice and concentration of the plasticizer and other formulation components. The terms "plasticized polyvinyl chloride," "polyvinyl chloride," and "PVC" are used herein to refer broadly to these classes of resins.

Because unplasticized PVC contains chlorine in the polymer structure, the polymer has an inherent degree of flame retardancy. The more rigid types of PVC, containing a minimal concentration of plasticizer, usually require only additional antimony trioxide to impart a satisfactory level of flame retardancy. However, as the amount of plasticizer is increased to yield more flexible resins, the degree of flammability significantly increases.

Both triaryl and diaryl alkyl phosphate esters have been used for some time to increase the flame retardancy of PVC resins. When used in modest addition to the primary plasticizer, these esters provide adequate retardancy in many low-risk applications. However, as continually higher flame retardancy demands are made of the resins to meet more stringent applications, increased concentration of these esters does not yield the desired retardancy level. Another group of materials, halogenated paraffins, also provide flame retardancy but are subject to limited use due to their relatively poor thermal stability.

U.S. Pat. No. 4,298,517 and its division, U.S. Pat. No. 4,397,977, each describe and claim halogenated resins such as PVC incorporating polyoxyalkylene tetrahalophthalates. Example 26 of the patents also describes plasticizing PVC with a mixture of 28 parts dioctyl phthalate and 12 parts of dioctyl tetrabromophalate. However, these patents do not recognize the exceptional thermal stability and high flame retarding ability of the 2-ethylhexyl tetrabromophthalate agent of this invention.

Therefore, it is the principal object of this invention to provide plasticized polyvinyl chloride compositions having a higher than usual level of flame retardancy while acceptably maintaining other important properties.

SUMMARY OF THE INVENTION

The foregoing and other objects, advantages and features of the subject invention may be obtained by incorporating in a plasticized PVC resin an effective amount of the di-2-ethylhexyl ester of tetrabromophthalic acid and, optionally, an enhancing agent. Preferably, the resin incorporates about 1–75 parts per hundred parts ("PHR") of base resins by weight of the di-2-ethylhexyl ester of tetrabromophthalic acid, and about 0–15 PHR by weight of an enhancing agent such as antimony trioxide, all by weight of the polymer portion of the plasticized resin composition.

In its method aspect, the present invention encompasses a method for flame retarding plasticized PVC resin compositions without significantly adversely affecting thermal stability or other properties of the resin. The method comprises the step of incorporating in the PVC resin an effective amount of the di-2-etylhexyl ester of tetrabromophthalic acid and, optinally, an enhancing agent.

By utilizing the unique flame retardant combination of this invention, a high degree of flame retardancy can be imparted to plasticized PVC compositions without adversely affecting thermal stability or other major properties of the resin.

DESCRIPTION OF THE PREFERRED EMBODIMENTS

It has been discovered that plasticized polyvinyl chloride resins having both a high degree of flame retardancy and retention of major resin characteristics can be realized by incorporating therein as the flame retardant therein either 2-ethylhexyl tetrabromophthalate or the combination thereof and an enhancing agent.

The plasticized PVC resins to which this invention is directed are well known compositions, characterized by excellent chemical and corrosion resistance, good physical strength and excellent electrical insulation. The flexible compositions are made by combining the PVC base polymer with plasticizers, such as one or more of the isomers of dioctyl phthalate (e.g., di-2-ethylhexylphthalate and di-octyl phthalate). In addition, stabilizers, pigments and other specialized components may be added for other specific purposes. A detailed description of PVC technology is given in the Encyclopedia of Polymer Science and Technology, 1971, Vol. 14, pp 305–433; and Modern Plastics Encyclopedia, 1986–1987, Vol. 63, pp 82–84.

The wide range of properties resulting from a myriad of components leads to resins tailored for a wide range of applications. Because many of these compositions are highly plasticized, the inherent flame retardant qualities of the base polymer have been in most cases seriously reduced.

The 2-ethylhexyl diester of tetrabromophthalic acid is utilized in accordance with this invention as a flame retardant plasticizer, optionally in combination with enhancing agents in the present compositions. The essential component of the flame retardant system is the di-2-ethylhexyl ester of tetrabromophthalic acid.

A second and optional component of the flame retardant system is an enhancing agent or so-called synergist for the bromine contained in the diester of tetrabromophthalic acid. In accordance with the present invention, certain metal compounds are employed with the bromine-containing compounds of this invention to promote a cooperative effect there between and thus to enhance the flame retardancy of the resultant plastic composition as compared to the flame retardancy of either one component used separately. Suitable enhancing agents include oxides and halides of antimony, arsenic, bismuth, tin and zinc. Exemplary enhancing agents include $Sb_2O_3$, $Sb_2O_5$, $SbCl_3$, $SbBr_3$, $SbI_3$, SbOCl, $As_2O_3$, $As_2O_5$, $ZnBO_4$, $BaB_2O_4.H2O$, 2 ZnO.3 $B_2O_3$.3.5 $H_2O$, and stannous oxide hydrate. The preferred enhancing agent is antimony trioxide.

The di-2-ethylhexyl ester of tetrabromophthalic acid is utilized in accordance with the present invention in an effective amount; that is, any amount which will achieve the desired level of flame retardancy in the plasticized PVC composition. In general, the amount of the diester employed will be in the range of about 1–75 PHR by weight of the base polymer, with a preferred range of 5–50 PHR.

The amount of optional enhancing agent employed in the present invention compositions is any amount which, when used with said bromine containing diesters, will promote a cooperative effect therebetween. In general, the amount is about 1–15 PHR by weight, preferably about 1–5 PHR, based on the weight of the base resin portion. While inclusion of the enhancing agent is highly utile and desirable, there are formulations in which the enhancing agents, because of their pigmenting effect, cannot be used.

It is also within the scope of the present invention to employ other materials in the present invention composition where one so desires to achieve a particular end result. Such materials include, without limitation, adhesion promotors, antioxdants, antistatic agents, antimicrobials, colorants, heat stabilizers, light stabilizers, pigments, plasticizers, preservatives, ultraviolet stabilizers and fillers. For a complete listing of these other additives, see Modern Plastics Encyclopedia, ibid., pp 112–182.

The amount of such other materials employed in the present invention compositions can be any quantity which will not substantially adversely affect the desired results derived from the present invention compositions. Thus, the amount used can be zero (0) PHR, based on the total weight of the base polymer up to that percent at which the composition can still be classified as a plastic. In general, such amount will be from about 0 PHR to about 75 PHR and, more desirably, from about 1 PHR to about 50 PHR.

The flame retardant plasticized polyvinyl chloride compositions of this invention are formulated using methods known in the art. In general, the base polymer may be combined with 2-ethylhexyl tetrabromophthalate and other additives in a blender and the mix fused and further blended on a two-roll mill, providing material for a number of fabricating procedures. Other suitable methods may be employed as is known in the art.

EXAMPLES

Comoounding/Test Specimen Preparation Procedures: All composition components (base PVC polymer, primary plasticizer, flame retardant plasticizer, stabilizers and enhancing agent) were combined and mixed in a blender. The charge was transfered to a 2-roll mill, preheated to 350° F. for fusion and further mixing. The discharged sheet was then compression molded, at 350° F., to a 0.0625 inch thickness, from which appropriate test specimens were stamped.

Composition of Examples 1–5, prepared by the foregoing procedure, are detailed in Table I. The base PVC polymer used was Geon 31, a product of B. F. Goodrich.

TABLE I

| Example | Primary Plasticizer PHR | Flame Retardant Additive PHR | Lead Stabilizer PHR | Antimony Trioxide PHR |
|---|---|---|---|---|
| 1 | TOTM 50 | None | 5 | 1.5 |
| 2 | None | Kronitex 50 50 | 5 | 1.5 |
| 3 | None | Santicizer 148 50 | 5 | 1.5 |
| 4 | TOTM 25 | DTBP 25 | 5 | 1.5 |
| 5 | TOTM 12.5 | DTBP 37.5 | 5 | 1.5 |

All values PHR base resin
TOTM - Kodaflex plasticizer, Eastman Chemical Co.
Stabilizer - Dythal, Associated Lead
Kronitex 50 - Triaryl phosphate, FMC Corp.
Santicizer 148 - Diaryl alkyl phosphate, Monsanto Co.
DTBP - Di-(2-ethylhexyl) tetrabromophthalate The compositions of Examples 1–5 were evaluated for flammability, tensile/elongation and thermal stability utilizing the following standard procedures:

Oxygen Index ASTM D2863: The oxygen index test is a measure of ease of extinction of a burning specimen in a controlled nitrogen/oxygen atmosphere. For this test, a specimen of nominal use thickness by 0.25 inches in width by 3.5 inches in length is clamped vertically at one end in a holder which is placed in a test column. A mixture of nitrogen and oxygen is introduced through the column. The nitrogen/oxygen ratio is adjusted so the specimen can be ignited at the top by a small pilot flame. The percentage of oxygen is adjusted until the level is reached where a specimen will just burn for a 3 minute period or for a length of 50 millimeters. That maximum oxygen concentration is reported as the Oxygen Index (OI). The greater the OI value, the more flame retardant the specimen tested.

Tensile/Elongation ASTM D638: A Die C dumbell specimen is clamped in an Instron testing machine fitted with appropriate grips and extensometer. A testing speed of 20 inches a minute is set, the machine started and operated until the specimen breaks. Selected tensile strengths and percent elongation are calculated from the appropriate test data.

Thermal Stabilitv ASTM D2115: Round specimens, 1 inch in diameter, are placed in an oven maintained at 177° C. A specimen is removed periodically over perhaps a 3-hour period or sooner if appreciable degradation occurs. Visual comparisons are made of the exposed specimens and a numerical value assigned, with 10 equalling lightest discoloration.

Data obtained for Examples 1–5 are shown in Table II.

TABLE II

| Example | OI % | Peak psi | 100% Strain psi | Break psi | Elong % | Thermal Stability |
|---|---|---|---|---|---|---|
| 1 | 27 | 3650 | 2530 | 2240 | 310 | 10 |
| 2 | 36 | 3250 | 2230 | 2110 | 310 | 8 |
| 3 | 31 | 2890 | 1970 | 1430 | 315 | 7 |
| 4 | 35 | 3330 | 2610 | 2350 | 370 | 10 |
| 5 | 43 | 3700 | 3030 | 2490 | 230 | 9 |

Analyses of the experimental results shown in Table II permit the following observations and conclusions:

EXAMPLE 1

A control example containing no invention additive illustrates the absence of significant flame retardancy. This Example also shows excellent thermal stability.

EXAMPLES 2 AND 3

These examples, containing prior art phosphate esters, provide good plasticization qualities but show flame retardancy limitations, even where the phosphate esters used as the sole plasticizer portion of the formulation. Moreover, both examples have limited thermal stability.

EXAMPLES 4 AND 5

These examples show the excellent flame retardancy achieved with the di-2-ethylhexyl ester of tetrabromophthalic acid while still maintaining adequate plasticizing qualities and high thermal stability.

EXAMPLE 6

To demonstrate the limitations of the prior art phosphate esters, substitution of one hundred percent of the primary plasticizer with phosphate exters in typical formulations yielded an oxygen index of 31 to 35 depending upon the choice of ester. On the other hand, one hundred percent substitution with the compounds of the present invention permits oxygen index values of greater than 45 to be achieved.

We claim:

1. A method for flame retarding plasticized flexible polyvinyl chloride resin without significant adverse affect on thermal stability measured in accordance with ASTM procedure D2115 or tensile strength measured in accordance with ASTM procedure D638 of the resin comprising the step of incorporating therein an effective amount of di-2-ethylhexyl tetrabromophthalate and, optionally, a flame retardant enhancing agent.

2. A method, as claimed in claim 1, wherein the enhancing agent is an oxide or halide of a metal selected from the group consisting of antimony, arsenic, bismuth, boron, tin and zinc.

3. A method, as claimed in claim 2, wherein the di-2-ethylhexyl tetrabromophthalate is present at a level of about 1–75 parts per hundred parts resin by weight and the enhancing agent is present at a level of about 1–15 parts per hundred parts resin by weight.

4. A flame retarded plasticized flexible polyvinyl chloride resin composition comprising:

a polyvinyl chloride polymer containing a plasticizer other than dioctyl phthalate;

an effective amount of di-2-ethylhexyl tetrabromophthalate; and optionally, an effective amount of a flame retardant enhancing agent, whereby the composition is thermally stable when meausred in accordance with ASTM procedure D2115 and tensile strength is not adversely affected when measured in accordance with ASTM procedure D638.

5. A flame retardant polyvinyl chloride resin composition, as claimed in claim 4, wherein the enhancing agent is an oxide or halide of a metal selected from the group consisting of antimony, arsenic, bismuth, boron, tin and zinc.

6. A flame retarded polyvinyl chloride resin composition, as claimed in claim 5, wherein the enhancing agent is present at a level of about 1–15 parts per hundred part resin by weight.

7. A flame retarded polyvinyl chloride resin composition, as claimed in claim 4, wherein the composition comprises about 1–75 parts per hundred parts resin by weight of di-2-ethylhexyl tetrabromophthalate.

* * * * *